D. W. ADAMS.
HORSE PACK WATER BAG SPRAYING APPARATUS.
APPLICATION FILED DEC. 17, 1910.
1,003,856.
Patented Sept. 19, 1911.
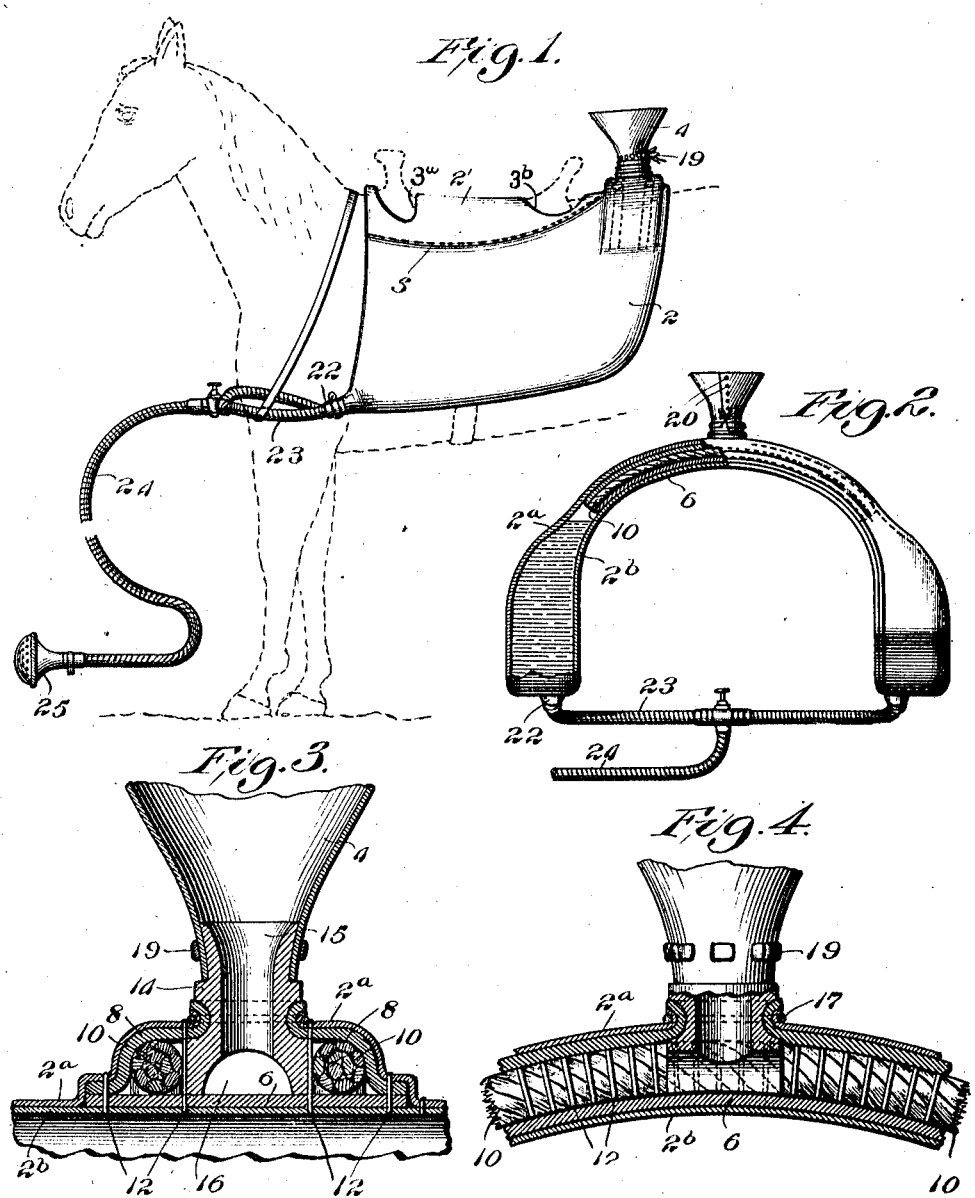

UNITED STATES PATENT OFFICE.

DANIEL W. ADAMS, OF GLENDALE SPRINGS, NORTH CAROLINA.

HORSE-PACK WATER-BAG SPRAYING APPARATUS.

1,003,856.　　　　Specification of Letters Patent.　　Patented Sept. 19, 1911.

Application filed December 17, 1910. Serial No. 597,802.

*To all whom it may concern:*

Be it known that I, DANIEL W. ADAMS, a citizen of the United States, residing at Glendale Springs, in the county of Ashe and State of North Carolina, have invented new and useful Improvements in Horse-Pack Water-Bag Spraying Apparatus, of which the following is a specification.

My invention relates to apparatus for spraying water or chemicals and is especially designed to be used for service in extinguishing forest fires, although it may also be used for light irrigation purposes, such as truck gardening and horticulture.

The apparatus comprises a double water-bag adapted to be placed over the saddle of a horse in the manner of a pack-saddle, and is provided with means for filling the compartments simultaneously and also with a common discharge hose. The whole can be quickly adjusted to the back of a horse and is ready for use at any instant, rendering it peculiarly adapted for use in the fighting of forest fires.

The advantageous features of my invention will be apparent from the following description in connection with the accompanying drawings, in which—

Figure 1 is a side elevation of an apparatus embodying my invention, showing the manner of mounting it upon a horse; Fig. 2 is a rear elevation of the same, partly in section; Fig. 3 is a cross section through the funnel and its attaching means; and Fig. 4 is a sectional view at a right angle to Fig. 3.

The double water-bag comprises a waterproof canvas bag 2, which extends across the saddle and is provided with two water sections or compartments arranged to hang symmetrically upon either side of the horse. It will be observed that the walls of each bag-section are so shaped that the general contour slopes from the upper rear corner to the lower forward corner, which is connected to the outlet or hose connection. The inner and outer canvas walls 2ª, 2ᵇ, are stitched along the line 3, upon each side, to form the top of the water compartments, the intermediate portion 2', forming a supporting saddle of double thickness which may be provided with apertures 3ª, 3ᵇ, to fit over the pommel and back of an ordinary riding saddle.

An important feature of the apparatus resides in the device for filling the water bag sections, and for preventing the collapse of the conduits leading from the funnel 4 into each section, thereby insuring an open passage at all times. The construction which I prefer to employ comprises an under-piece 6 forming the base member and upper-pieces 8, forming the top and side walls of the conduit leading in opposite directions and connecting the two bag sections. Extending through the conduit or filling passage upon either side are ropes 10, which are securely held in place by the lacing or wire belt-hooks 12 which bind the upper and lower leather parts together. It will be apparent that these ropes will maintain the conduit open at all times and yet render the conduit perfectly flexible so that it may conform to the shape of the horse. In the center of the conduit and midway between the two bag sections, I insert a funnel-support or mouth-piece 14, which is provided with a central bore or hole 15, and a transverse arcuate semi-tubular channel 16, joining the conduit upon either side. The mouth-piece is held in place by a binding core or wire 17 which forces the leather strips and canvas about the opening into an annular groove. I have found it convenient to construct the mouth-piece of resinous wood and arranged with the layers concentric with the bore or opening, but it is evident that it may be made of other material. The funnel is preferably constructed of leather and is secured to the neck of the support by means of a rawhide lacing or draw-cord 19. The funnel is made from a single piece of leather and is provided with snap or glove fasteners 20 along the meeting edges, so that it may be opened and flattened out and placed under the saddle when not in use. The outlets have a screw connection 22 with a hose 23 joining the bag sections, and discharge through a single hose 24, connected by means of a valved union and provided with a spray nozzle 25.

The operation of my horse pack spraying apparatus will be understood from the foregoing description, as will also the several advantageous features thereof. The double water-bag is so constructed that it may be used in conjunction with the ordinary riding saddle and without interfering with the comfort of the rider. The location and arrangement of the funnel and conduits enable the bag to be filled quickly, and in case one section should fill before the other the liquid may flow across through the conduit connection.

It is manifest that many changes may be made in the details of construction without departing from the spirit of my invention.

I claim:—

1. A pack saddle water-bag comprising opposite bag-sections having inner and outer flexible collapsible walls, an intermediate flexible supporting portion, and a non-collapsible conduit connecting the sections through said intermediate portion.

2. A pack saddle water-bag comprising opposite bag-sections having inner and outer flexible collapsible walls, an intermediate flexible supporting portion, a non-collapsible conduit connecting the sections through said intermediate portion, and a funnel-support extending within said conduit.

3. A pack saddle water-bag comprising opposite bag-sections having inner and outer flexible collapsible walls, and intermediate flexible supporting portion, a non-collapsible conduit connecting the sections through said intermediate portion, and a funnel-support extending within said conduit and provided with a channel opening in opposite directions therein.

4. A pack saddle water-bag comprising opposite bag-sections having inner and outer flexible collapsible walls, an intermediate flexible supporting portion, said sections being substantially quadrangular and sloping from the rear upper corner to the lower forward corner, a conduit connecting the bag-sections and having a central funnel-connection, and a hose connection at the lower forward corner of each section.

5. A pack saddle water-bag comprising opposite bag-sections having inner and outer flexible collapsible walls, an intermediate flexible supporting portion, said sections being substantially quadrangular and sloping from the rear upper corner to the lower forward corner, a conduit connecting the bag-sections and having a central funnel-connection, means for maintaining an open passage through said conduit, and a hose connection at the lower forward corner of each section.

6. A pack saddle water-bag comprising opposite bag-sections having continuous inner and outer walls forming an intermediate flexible supporting portion, said sections being substantially quadrangular and sloping from the rear upper corner to the lower forward corner, a conduit connecting the bag-sections and having a central funnel-connection, a hose connecting the lower forward corners of the bag sections, and a discharge hose connected with said connecting hose.

7. A pack saddle water-bag comprising opposite bag-sections having continuous inner and outer flexible walls and an intermediate flexible supporting portion, said intermediate portion having openings to receive the pommels of a saddle, a conduit connecting the bag sections and having a funnel connection, and hose connections attached to each bag section.

In testimony whereof I have hereunto set my hand in presence of two subscribing witnesses.

DANIEL W. ADAMS.

Witnesses:
R. F. GROVER,
J. FLOYD WYATT.